Patented May 13, 1930

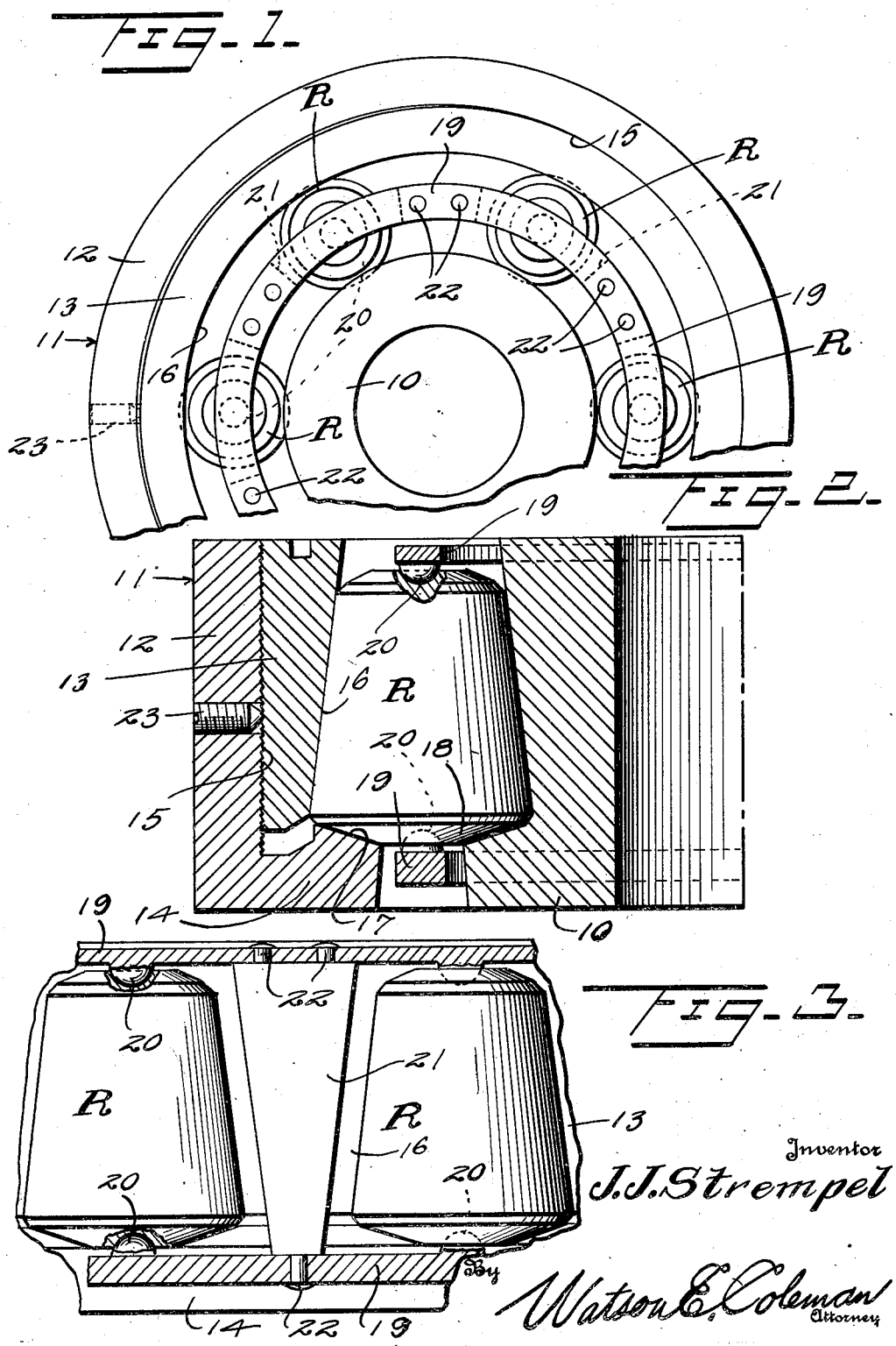

1,758,479

UNITED STATES PATENT OFFICE

JULIUS J. STREMPEL, OF HASKELL, TEXAS, ASSIGNOR OF ONE-HALF TO JOHN H. ZAHN, OF HASKELL, TEXAS

ADJUSTABLE ROLLER BEARING

Application filed February 18, 1928. Serial No. 255,411.

This invention relates to roller bearings and more particularly to a roller bearing which is adjustable to take up wear thereon.

An important object of the invention is to provide a novel and improved outer race construction for devices of this character.

A further object of the invention is to provide a durable and efficient cage construction for devices of this character.

These and other objects I attain by the construction shown in the accompanying drawing, wherein for the purpose of illustration is shown a preferred embodiment of my invention and wherein:—

Figure 1 is a plan view of an adjustable roller bearing constructed in accordance with my invention;

Figure 2 is an enlarged sectional view therethrough;

Figure 3 is a detail sectional view showing the construction of the cage and the mounting of the rollers therein.

Referring now more particularly to the drawing, the numerals 10 and 11 generally designate inner and outer race elements of which the outer element 11 is formed in a frame section 12 and a race section 13. The frame section 12 is annular and has at one end an inwardly directed flange 14. The inner face of the frame section is threaded at 15 with fine threads for coaction with similar threads formed upon the outer face of the race section. The race section 13 has its inner face 16 tapered to correspond to the taper of the rollers R employed, while the flange 14 has its inner side face 17 tapered to correspond to the taper of the end faces 18 of the rollers R.

The numeral 19 indicates the annular end elements of a cage, each end element 19 having circumferentially spaced hemispherical bosses or tits 20 on its inner face corresponding in number to the rollers R. The numeral 21 designates cage braces, each in the form of a bar having its ends abutting the end elements 19 of the cage and having its side faces tapered to correspond to the taper of the rollers. Opposite ends of the braces have projecting pins 22 extending through and riveted upon the outer faces of the end elements 19.

It will be obvious that with a device of this character, the rollers are firmly held in proper circumferentially spaced position and at the same time permitted to rotate freely. In event wear upon the rollers causes looseness in the bearings, this may be removed by rotating the race section 13 until the looseness is removed. The race section 13 is held in adjusted position by a set-screw 23 extending through the frame 12.

Since the construction hereinbefore set forth is capable of a certain range of change and modification without materially departing from the spirit of the invention, I do not limit myself to such specific structure except as hereinafter claimed.

I claim:—

In an adjustable roller bearing, inner and outer race elements, tapered rollers interposed therebetween and a cage maintaining the rollers in properly spaced relation, the outer race element being formed in a frame section and a race section, the frame and race sections having coacting screw-threads permitting adjustment of the race section axially of the frame section, the race section being tapered for coaction with the outer faces of the rollers, corresponding ends of the frame section and inner race element having flanges against which the larger ends of the rollers engage, the adjustable race section crowding the rollers toward said flanges, the inner race element increasing in diameter from said flange toward its opposite end.

In testimony whereof I hereunto affix my signature.

JULIUS J. STREMPEL.